United States Patent
Sugimoto et al.

(10) Patent No.: US 9,565,743 B2
(45) Date of Patent: Feb. 7, 2017

(54) LOAD CONTROL UNIT

(71) Applicant: YAZAKI CORPORATION, Minato-ku, Tokyo (JP)

(72) Inventors: Terumitsu Sugimoto, Shizuoka (JP); Yasushi Oba, Shizuoka (JP); Masahiro Takamatsu, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 12 days.

(21) Appl. No.: 14/432,761

(22) PCT Filed: Oct. 1, 2013

(86) PCT No.: PCT/JP2013/076700
§ 371 (c)(1),
(2) Date: Apr. 1, 2015

(87) PCT Pub. No.: WO2014/054637
PCT Pub. Date: Apr. 10, 2014

(65) Prior Publication Data
US 2015/0282280 A1    Oct. 1, 2015

(30) Foreign Application Priority Data

| Oct. 4, 2012 | (JP) | 2012-222424 |
| Oct. 4, 2012 | (JP) | 2012-222426 |
| Oct. 4, 2012 | (JP) | 2012-222428 |

(51) Int. Cl.
*B60Q 1/14* (2006.01)
*H05B 37/02* (2006.01)
(Continued)

(52) U.S. Cl.
CPC ......... *H05B 37/0272* (2013.01); *B60Q 3/0286* (2013.01); *B60Q 3/0293* (2013.01);
(Continued)

(58) Field of Classification Search
CPC ....... B60Q 3/02; B60Q 3/0293; B60Q 3/0223; B60Q 2300/22
See application file for complete search history.

(56) References Cited

U.S. PATENT DOCUMENTS 5,798,575 A * 8/1998 O'Farrell .................. B60R 1/00
                                                    307/10.1
6,097,283 A    8/2000 Szudarek et al.
(Continued)

FOREIGN PATENT DOCUMENTS

DE    102008033733 A1    1/2010
FR         2949403 A1    3/2011
(Continued)

OTHER PUBLICATIONS

Search Report issued on Jun. 1, 2016 in the counterpart European application.
(Continued)

*Primary Examiner* — Jason M Crawford
(74) *Attorney, Agent, or Firm* — Mots Law, PLLC

(57) ABSTRACT

In a load control unit, three R, G, and B LED chips that constitute each light source (33a-33d) of reading lamps (25-31) and a connector (35) with a built-in controller are mounted on a circuit board (37) to thereby eliminate the connection of a controller (35b) built into the connector (35) with the built-in controller and the respective light sources (33a-33d) by signal lines. In addition, the controller (35b) and a lighting ECU (43) are connected by a multiplex communication line (39), and the multiplex communication line (39) is routed in pillars (15, 17) of a vehicle (1). Consequently, the number of wires can be reduced compared with when individual wires connected to the respective light sources (33a-33d) are passed through the pillars (15, 17), and thereby making it possible to effectively use limited (Continued)

spaces within the pillars (15, 17) through which many other wires are passed.

20 Claims, 10 Drawing Sheets

(51) Int. Cl.
*B60Q 3/02* (2006.01)
*B60R 16/02* (2006.01)
*H05B 33/08* (2006.01)
*B60R 22/48* (2006.01)
*H01R 13/66* (2006.01)
*H01R 12/72* (2011.01)

(52) U.S. Cl.
CPC .............. *B60R 16/02* (2013.01); *B60R 22/48* (2013.01); *H01R 13/6658* (2013.01); *H05B 33/0845* (2013.01); *H05B 33/0857* (2013.01); *H05B 37/0254* (2013.01); *B60R 2022/4816* (2013.01); *B60R 2022/4858* (2013.01); *B60R 2022/4866* (2013.01); *H01R 12/724* (2013.01); *H01R 2201/26* (2013.01)

(56) References Cited

U.S. PATENT DOCUMENTS

| | | | |
|---|---|---|---|
| 2005/0105298 A1* | 5/2005 | Tsuchiya | B60Q 3/0293 362/490 |
| 2006/0274467 A1 | 12/2006 | Nagasawa | |
| 2008/0112175 A1 | 5/2008 | Bucher | |
| 2008/0192499 A1* | 8/2008 | Gardner | B60Q 3/0293 362/488 |
| 2009/0021955 A1* | 1/2009 | Kuang | B60Q 3/0259 362/479 |
| 2009/0302766 A1* | 12/2009 | Behr | B60Q 1/0023 315/82 |
| 2010/0052536 A1 | 3/2010 | Zielinski et al. | |
| 2010/0327747 A1* | 12/2010 | Harris | B60Q 1/2607 315/77 |
| 2013/0035901 A1* | 2/2013 | Breed | B60J 7/0573 702/188 |
| 2016/0075276 A1 | 3/2016 | Sugimoto et al. | |

FOREIGN PATENT DOCUMENTS

| | | |
|---|---|---|
| JP | H05-129051 A | 5/1993 |
| JP | H07-095658 A | 4/1995 |
| JP | H09-290682 A | 11/1997 |
| JP | 2003-063392 A | 3/2003 |
| JP | 2003-327078 A | 11/2003 |
| JP | 2004-259582 A | 9/2004 |
| JP | 2004-306848 A | 11/2004 |
| JP | 2006-062594 A | 3/2006 |
| JP | 2007-253807 A | 10/2007 |
| JP | 2007-276671 A | 10/2007 |
| JP | 2008-143457 A | 6/2008 |
| JP | 2008-254506 A | 10/2008 |
| JP | 2009-269492 A | 11/2009 |
| JP | 2010-064587 A | 3/2010 |
| JP | 2010-509131 A | 3/2010 |
| JP | 2011-020538 A | 2/2011 |
| JP | 2011-105157 A | 6/2011 |
| JP | 2012-133985 A | 7/2012 |
| WO | 2008/060994 A2 | 5/2008 |
| WO | 2008/087832 A1 | 7/2008 |
| WO | 2011/082998 A1 | 7/2011 |
| WO | 2012/086624 A1 | 6/2012 |

OTHER PUBLICATIONS

Office Action issued on May 31, 2016 in the counterpart Japanese application.
Office Actin issued on Jun. 21, 2016 in the counterpart Japanese application No. 2012-222424.
Office Actin issued on Jun. 21, 2016 in the counterpart Japanese application No. 2012-222426.

* cited by examiner (a)

(b)

B : POWER SOURCE
G : GROUND
S : SIGNAL (a)

(b)

(a)

(b)

LOAD CONTROL UNIT

TECHNICAL FIELD

The present invention relates to a load control unit that controls driving of electric loads through a controller.

BACKGROUND

A controller is essential for the drive control of loads. In connection, there is a known constitution where a connector having a control unit built in to function a part of the controller is connected to a main control unit through a multiplex communication line, and the connector with the built-in control unit is connected to respective loads through wires for controlling the driving of the respective loads (see PTLs 1-5).

According to such a conventional constitution, as the built-in control unit of the connector performs the drive control of loads, it is possible to reduce the burden of the main control unit because its role of directly performing the drive control of loads becomes unnecessary. Further, as it has only to connect a wire extending from each load to the connector with the built-in control unit, which is connected to the main control unit through the multiplex communication line, instead of directly connecting respective wires extending from the respective loads to the main control unit individually (in parallel), it is possible to reduce the number of wires to be routed, thereby realizing weight saving of the whole constitution.

CITATION LIST

Patent Literature

PTL 1: JP 2012-133985 A
PTL 2: JP 2003-327078 A
PTL 3: JP 2008-254506 A
PTL 4: JP 2010-064587 A
PTL 5: JP 2011-105157 A

SUMMARY

In the conventional constitution mentioned above, nevertheless, there still exist wires connecting between the connector and the respective loads individually (in parallel). Therefore, it is necessary to connect the wires extending from all loads with the connector with the built-in control unit, which could be factors for causing a part of the connector with the built-in control unit, into which the wires from the respective loads are inserted, to be increased in size.

Under the above-mentioned situation, an object of the present invention is to provide a load control unit which is capable of reducing the number of wires as much as possible when constructing a unit where the drive of loads is controlled by a controller.

In order to attain the above object, according to the first aspect of the present invention, there is provided a load control unit for controlling driving of a plurality of loads based on a control signal inputted from a main control unit into a controller, comprising: the loads implemented on a single substrate; and a connector with a built-in controller, which is mounted on the substrate and to which the respective loads are connected through a circuit pattern of the substrate electrically, the connector having the controller built in, wherein the controller is configured to control the driving of the respective loads based on the control signal which is transmitted from the main control unit and inputted to the controller through a multiplex communication line connected to a connector part of the connector with the built-in controller.

The loads may be LED chips as light sources for illuminating an interior of a vehicle, and the controller may be configured to control lighting of the LED chips.

With the load control unit according to the first aspect of the present invention, as the connector with the built-in controller is mounted on the single substrate implementing the plurality of loads so that the controller controls the driving of these loads, the wires connecting the controller and the loads with each other in parallel are made redundant and therefore, a circuit pattern on the substrate takes the place of these wires. Consequently, it is possible to reduce the number of wires as much as possible when constructing a unit where a controller controls driving of a plurality of loads based on a control signal transmitted from a main control unit.

DESCRIPTION OF EMBODIMENTS

Embodiments of the present invention will be described with reference to drawings, below.

First Embodiment

Figure 1:
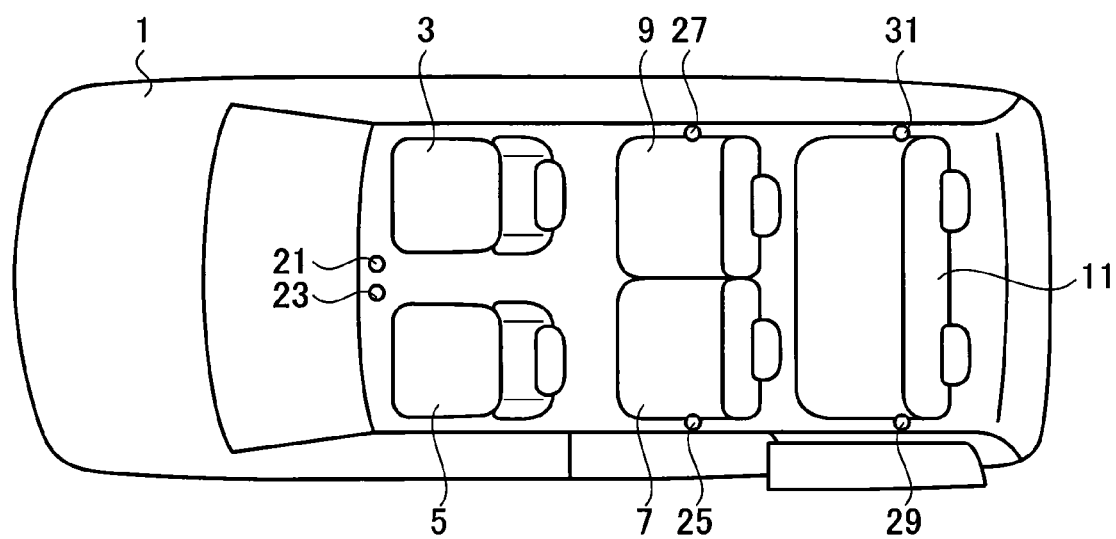
FIG. 1 is an explanatory view illustrating an arrangement of an in-vehicle illuminating apparatus to which a load control unit according to a first embodiment is applied.

FIG. 1 is an explanatory view illustrating the arrangement of lighting modules to which a load control unit according to a first embodiment of the present invention is applied.

In a vehicle 1, as illustrated in FIG. 1, map lamps 21, 23 respectively corresponding to a driver's seat 3 and an assistant driver's seat 5 are arranged at a frontal center of a roof liner 13 (see FIG. 5) in the vehicle. Further, the vehicle 1 is provided, on left and right sides of the roof liner 13, with reading lamps 25 to 31 corresponding to seats 7, 9 in the second line and a seat 11 in the third line (note: as for the seat 11 in the third line, the reading lamps are arranged so as to correspond to both ends of the "triple" seat). Then, a lighting module according to the first embodiment is applied to the reading lamps 25 to 31 and their lighting control system.

Figure 2:
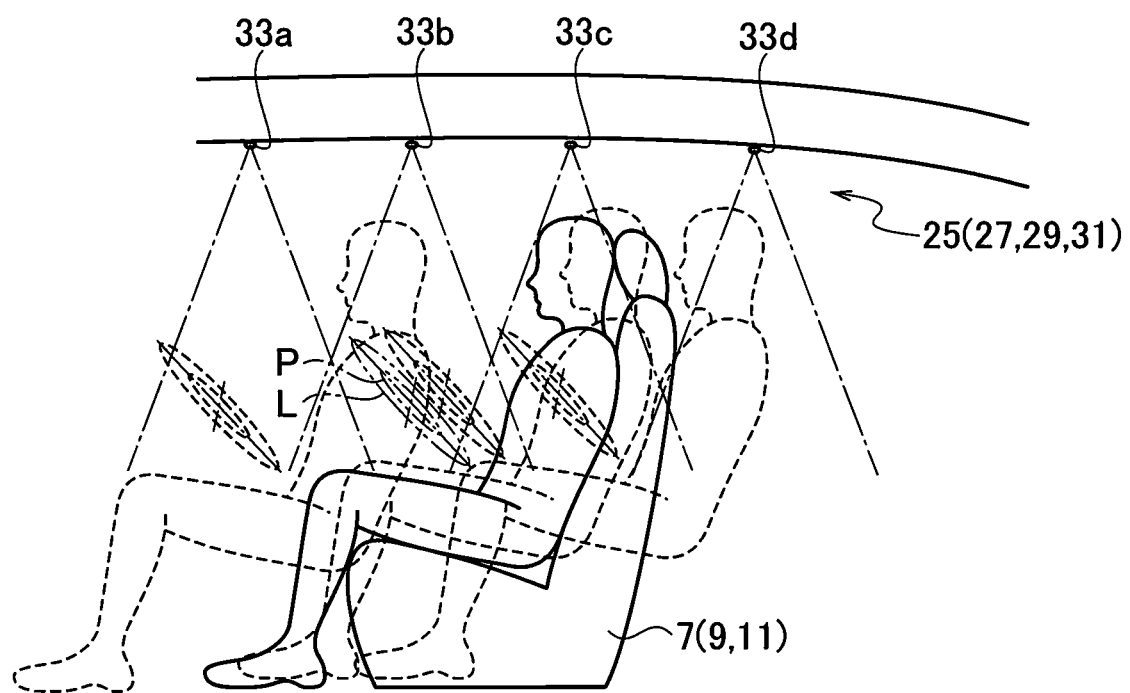
FIG. 2 is an explanatory view illustrating a relative positional relationship between light sources and vehicle seats illustrated in FIG. 1.

As illustrated in the explanatory view of FIG. 2, respective reading lamps 25 to 31 have four light sources 33*a* to 33*d* arranged at intervals in the front-back direction so as to sharingly cover the slide ranges of respective seats 7, 9, 11 (namely, ranges of passengers seated thereon) in the front-back direction. In the first embodiment, each of the light sources 33*a* to 33*d* includes three LED chips of R, G, and B, and is adapted so as to allow the emission of optional light by adjusting respective brightness of the LED chips.

In connection, double circles in FIG. 2 designate respective eye points P (ranges of moving line of sight) of passengers seated on the seats 7, 9, 11 at respective slide positions of the seats 7, 9, 11 and respective eye ranges L (ranges of moving eye points P due to the differences in passenger's body shape).

Next, the schematic constitution of a control system of the reading lamps 25 to 31 and the map lamps 21, 23 will be described with reference to a block diagram of FIG. 3. In the first embodiment, the light sources 33*a* to 33*d* of respective reading lamps 25 to 31 are implemented on one circuit substrate 37 (board). A connector 35 with a built-in controller (connector with a built-in control unit) is mounted on the circuit substrate 37. The connector 35 with the built-in controller includes a female connector part 35 (connector part) with which a male connector 39*a* of a multiplex communication line 39 can be connected, and a controller 35*b* (control unit) which is composed of one-chip microcomputer, for example.

Each of the map lamps 21, 23 includes light sources 33*e*, 33*f* each including three LED chips of R, G, and B to allow the emission of optional color. The light sources 33*e*, 33*f* of each of the map lamps 21, 23 are implemented on another circuit substrate 37. A connector 35 with a built-in controller is mounted on this circuit substrate 37, too.

The light sources 33*a* to 33*d* or the light sources 33*e*, 33*f*, which are implemented in each circuit substrate 37, are connected to the controller 35*b*.

Figure 4:
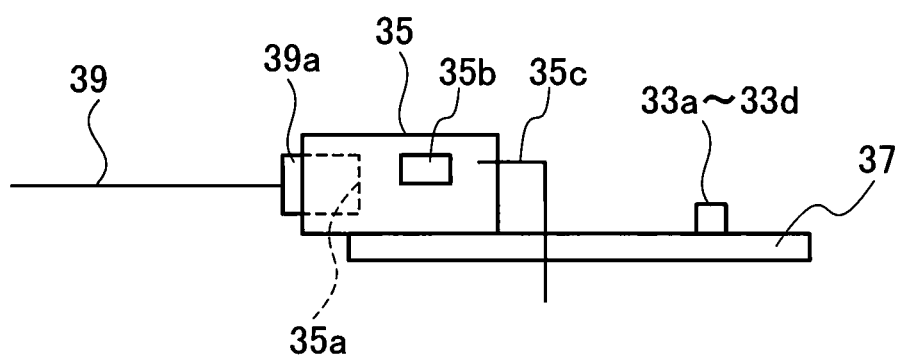
FIG. 4(a) is an explanatory view of a connection relationship between a circuit substrate of FIG. 3 and a lighting ECU or the light sources with respect to a connector with a built-in controller mounted on the circuit substrate in lateral view.
FIG. 4(b) is an explanatory view of the same connection relationship in top view.
Figure 4:
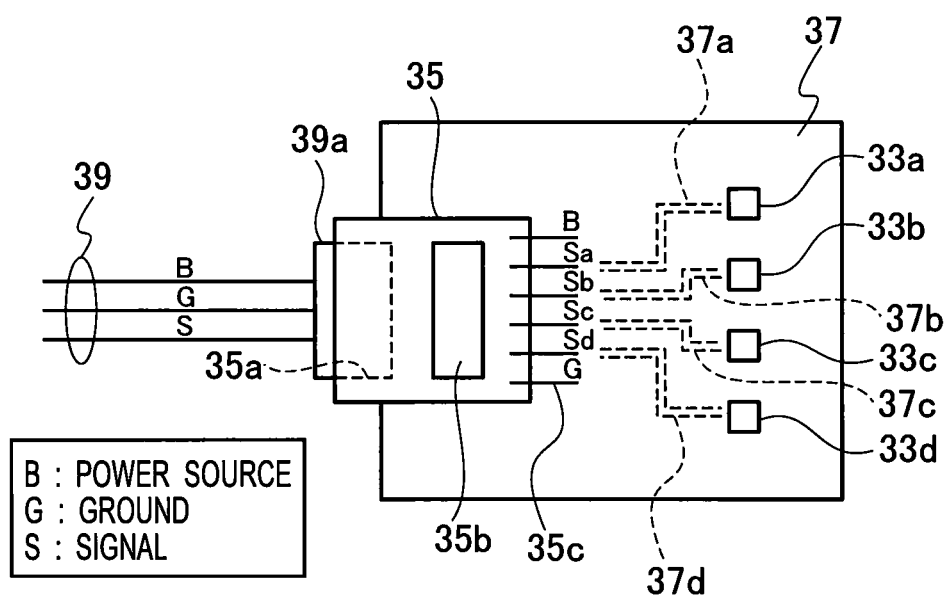

Here, the connection structure of the light sources 33*a* to 33*d* with the controller 35*b* will be described with the connector 35 with the built-in controller on the circuit substrate 37 on which the light sources 33*a* to 33*d* of the reading lamps 25 to 31 are implemented, as an example. As illustrated in FIGS. 4(*a*) and 4(*b*), the controller 35*b* is connected to circuit patterns 37*a* to 37*d* of the circuit substrate 37 (see FIG. 4(*b*)) through L-shaped terminals 35*c* extending outwardly through a housing of the connector 35 with the built-in controller. The light sources 33*a* to 33*d* are connected to the circuit patterns 37*a* to 37*d*, respectively.

Note, the circuit patterns 37*a* to 37*d* may be composed by conductive patterns formed on the surface of the circuit substrate 37. In case of the circuit substrate 37 composed of a metal-core substrate having a metal plate (core part) as an intermediate layer, alternatively, the circuit patterns 37*a* to 37*d* may be composed of the metal plate as the intermediate layer.

Further, a multiplex communication line 39 from a lighting ECU (Electronic Control Unit) 43 (a main control unit) is connected to the controller 35*b* through the connector part 35*a* and the male connector 39*a*.

Based on control signals inputted from the lighting ECU 43 through the multiplex communication line 39, therefore, the controller 35*b* controls to turn the light sources 33*a* to 33*d* of respective reading lamps 25 to 31 and the light sources 33*e*, 33*f* of the map lamps 21, 23 on and off.

Figure 5:
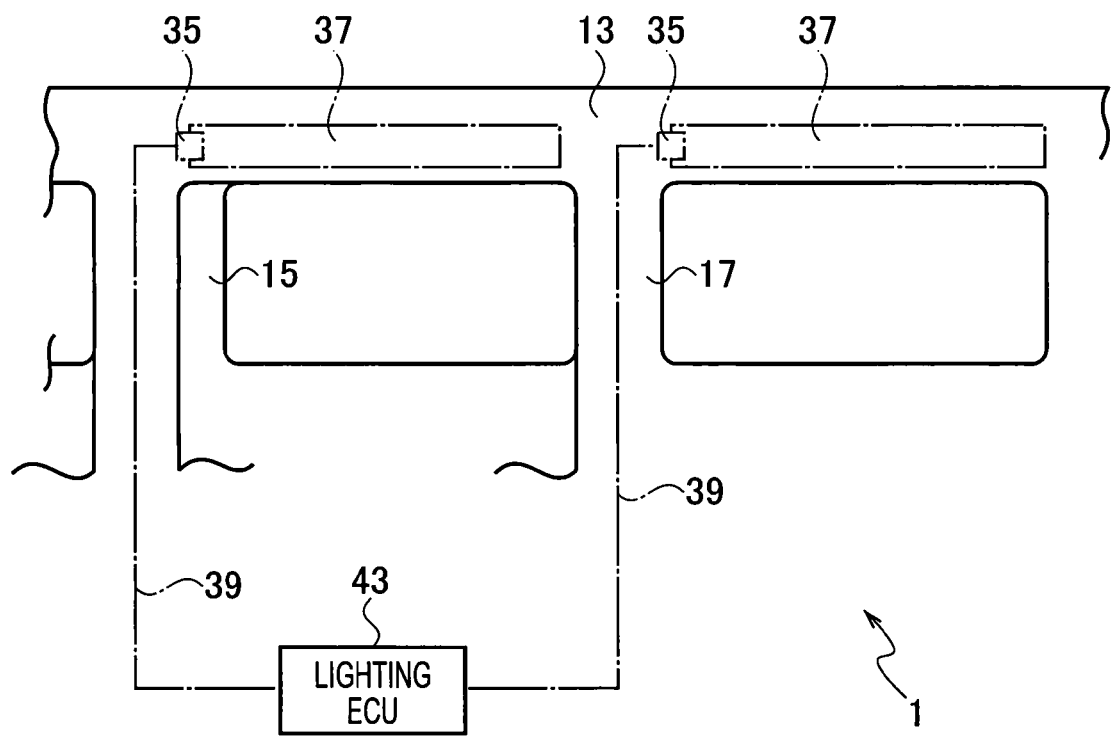
FIG. 5 is an explanatory view illustrating the wiring layout between the substrate for reading lamps of FIG. 3 and the lighting ECU.

As illustrated with the explanatory view of FIG. 5, the circuit substrates 37 are arranged on the roof liner 13 of the vehicle 1, and the multiplex communication lines 39 extending from the lighting ECU 43, each of which is connected to the connector 35 with the built-in controller on the circuit substrate 37, are routed inside pillars 15, 17 of the vehicle 1, respectively.

Since wires inside the pillars 15, 17 are composed of the multiplex communication lines 39, the number of wires can be reduced in comparison with the arrangement where individual wires to be connected to the respective light sources 33*a* to 33*d* are routed inside the pillars 15, 17 and therefore, it is possible to use limited spaces inside the pillars 15, 17 in which many other wires are also routed, effectively.

Figure 3:
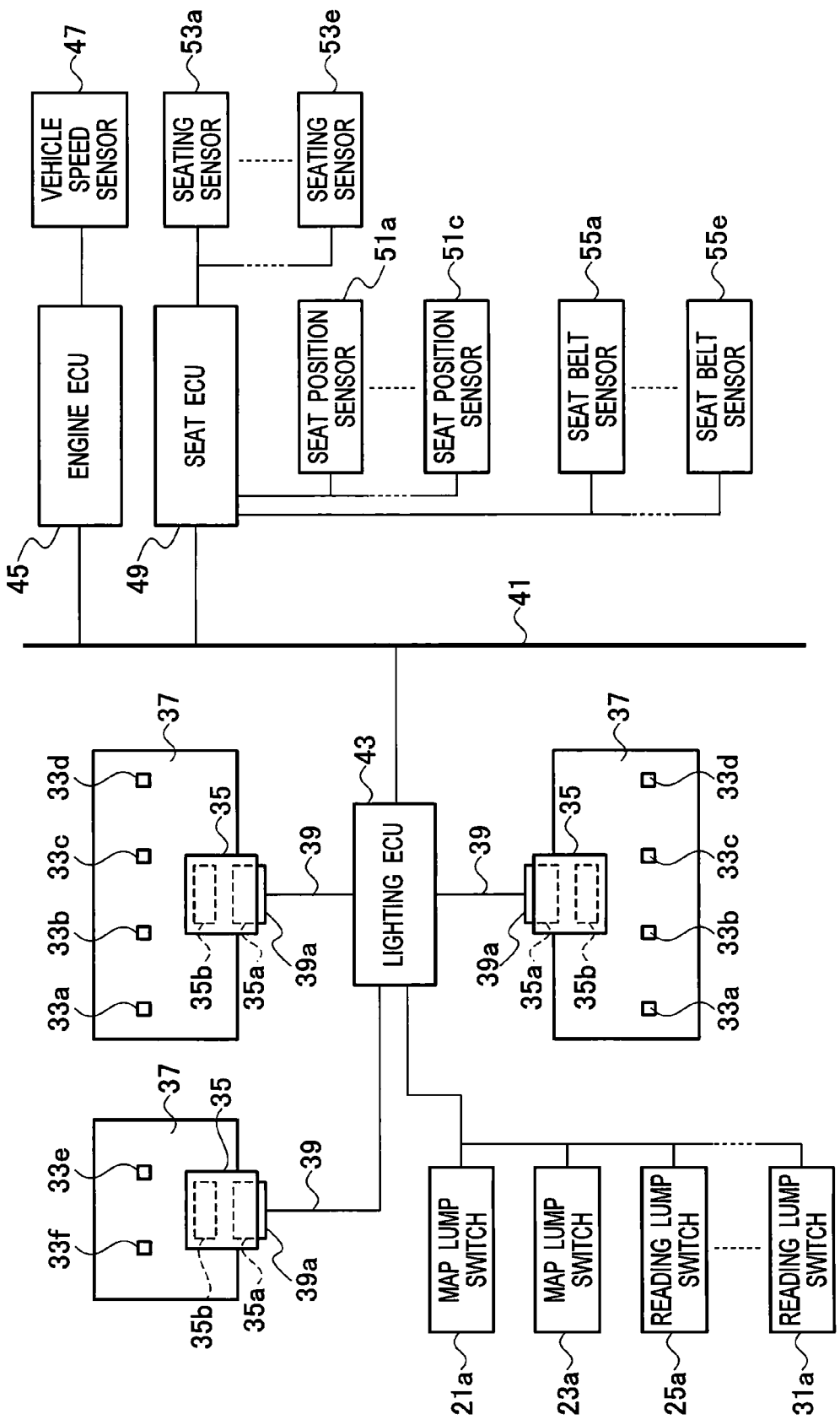
FIG. 3 is a block diagram illustrating a schematic constitution of a control system for map lamps and reading lamps illustrated in FIG. 1.

As illustrated in FIG. 3, vehicle speed data of the vehicle 1, which has been measured by a vehicle speed sensor 47 and transmitted from an engine ECU 45 through an in-vehicle LAN 41, is inputted to the lighting ECU 43 with respect to each constant cycle. Also, slide position data of the seats 7, 9, 11 in the front-back direction, which has been detected by seat position sensors 51*a* to 51*c* and transmitted from a seat ECU 49 through the in-vehicle LAN 41, is inputted to the lighting ECU 43 with respect to each constant cycle. The slide position data of the seats 7, 9, 11 may be inputted whenever the lighting ECU 43 demands the data for the seat ECU 49.

Inputted from the seat ECU 49 to the lighting ECU 43 through the in-vehicle LAN 41 are seating-condition data about the seats 7, 9 in the second line and the seat 11 (for three passengers) in the third line, which have been detected by seating sensors 53*a* to 53*e* and seatbelt fitting-condition data about the seats 7, 9 in the second line and the seat 11 (for three passengers) in the third line, which have been detected by seat belt sensors 55*a* to 55*e*.

Map lamp switches 21*a*, 23*a* for turning the map lamps 21, 23 on/off and reading lamp switches 25*a* to 31*a* for turning the reading lamps 25 to 31 on/off are connected to the lighting ECU 43 through an interface (not illustrated).

Then, the lighting ECU 43 controls to turn the map lamps 21, 23 and the reading lamps 25 to 31 on/off, based on the inputs from the above-mentioned objects to be connected. In the first embodiment, especially, the lighting ECU 43 controls to turn the light sources 33*a* to 33*d* of the respective reading lamps 25 to 31 on/off, based on the slide position data of the seats 7, 9, 11 in the front-back direction, which has detected by the seat position sensors 51*a* to 51*c* and transmitted from the seat ECU 49, and the ON/OFF states at the reading lamp switches 25*a* to 31*a*.

To this end, the lighting ECU 43 includes CPU, RAM, ROM, hard-disc, and the others (all not illustrated). Then, referring to a table stored in the hard-disc and using the RAM as a work area according to the program stored in the ROM, the CPU executes the control of turning the light sources 33*a* to 33*d* of the respective reading lumps 25 to 31.

In the table stored in the hard-disc, there are defined the slid positions of the seats 7, 9, 11 in the front-back direction and the corresponding lighting patterns of the light sources 33a to 33d (including brightness=luminance) and their lights-out patterns.

Figure 6:
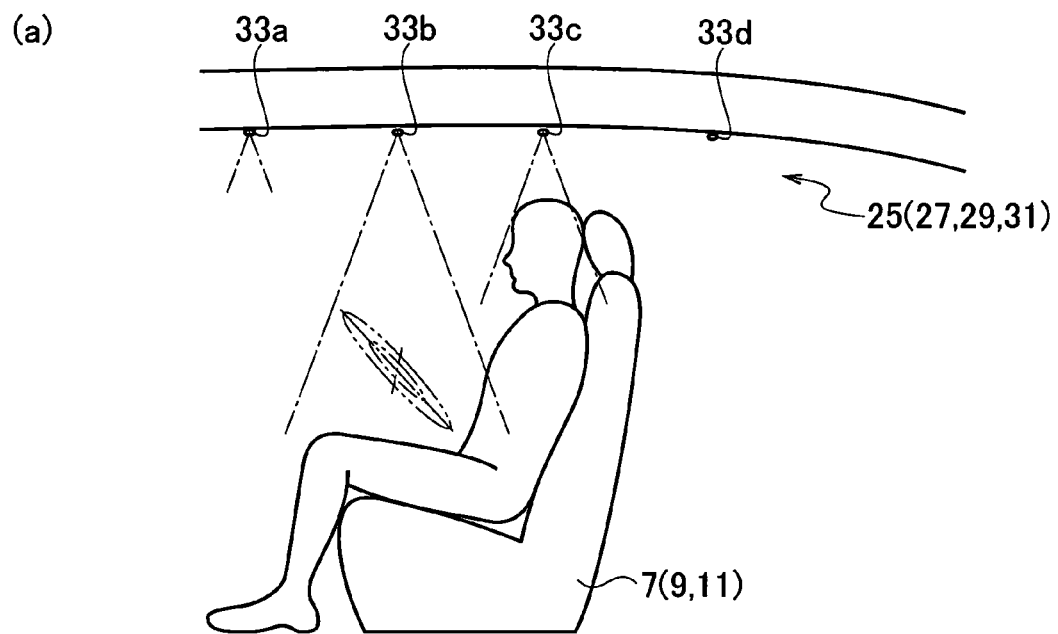
FIGS. 6(a) and 6(b) are explanatory views illustrating one example of a relationship between a slide position of a seat in the front-back direction, which has been specified on a table stored in a hard-disc of the lighting ECU of FIG. 3, and the lighting pattern of the light sources.
Figure 6:
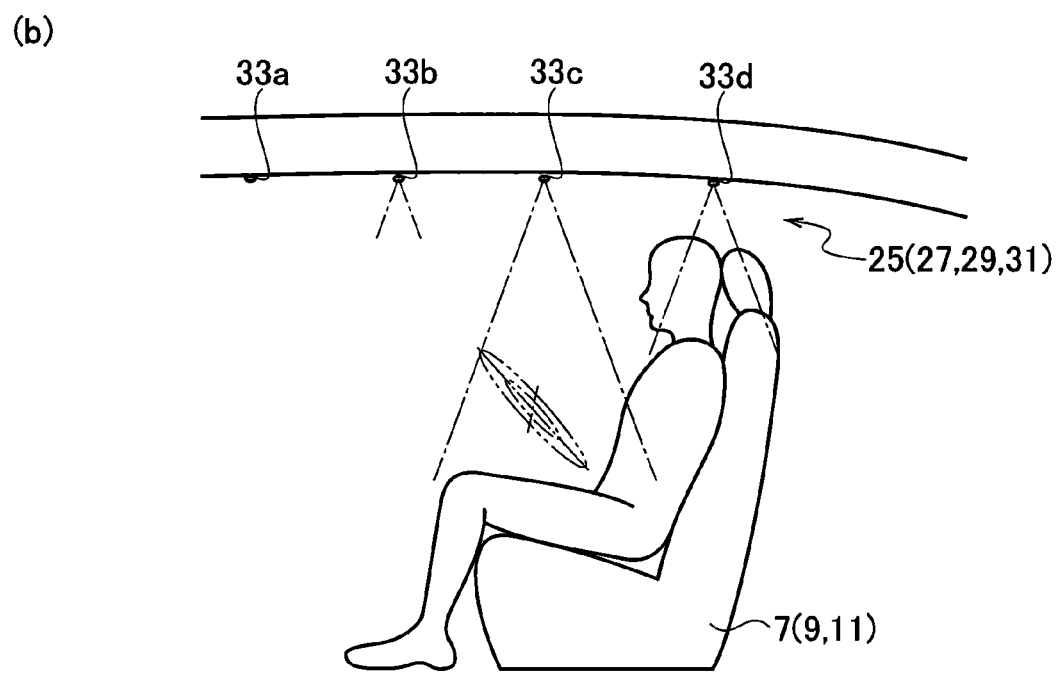

For instance, as illustrated with the explanatory view of FIG. 6(a), in the lighting pattern when the seat 7 (9, 11) is in a substantially intermediate slide position in the front-back direction, the second light source 33b from front is turned on with 100% duty. Also, the light source 33a in the first front line is turned on with 20% duty, the third light source 33c from front with 50% duty, and the rearmost light source 33d is turned off.

Additionally, as illustrated with the explanatory view of FIG. 6(b), in the lighting pattern when the seat 7 (9, 11) is in a substantially intermediate slide position in the front-back direction, the third light source 33c from front is turned on with 100% duty. Also, the second light source 33b from front is turned on with 20% duty, the rearmost light source 33d from front with 50% duty, and the frontmost light source 33a is turned off.

As mentioned above, according to the first embodiment, three LED chips of R, G, B forming the light sources 33a to 33d of the lighting lamps 25 to 31 and the connector 35 with the built-in controller are implemented on the same circuit substrate 37 to abolish the connecting between the controller 35b in the connector 35 with the built-in controller and the respective light sources 33a to 33d through signal lines. Simultaneously, the controller 35b and the lighting ECU 43 are connected to each other through the multiplex communication line 39, and the multiplex communication lines 39 are routed inside the pillars 15, 17 of the vehicle 1.

Consequently, the number of wires can be reduced in comparison with the arrangement where individual wires to be connected to the respective light sources 33a to 33d are routed inside the pillars 15, 17, and therefore, it is possible to use limited spaces inside the pillars 15, 17 in which many other wires are also routed, effectively.

Although the first embodiment is directed to the application of the load control unit of the present invention to the lighting module for illuminating the interior of a vehicle, the load control unit of the present invention is broadly applicable in controlling the driving of a plurality of loads besides the light sources for illumination, based on the control signal inputted to the controller.

Second Embodiment

Figure 7:
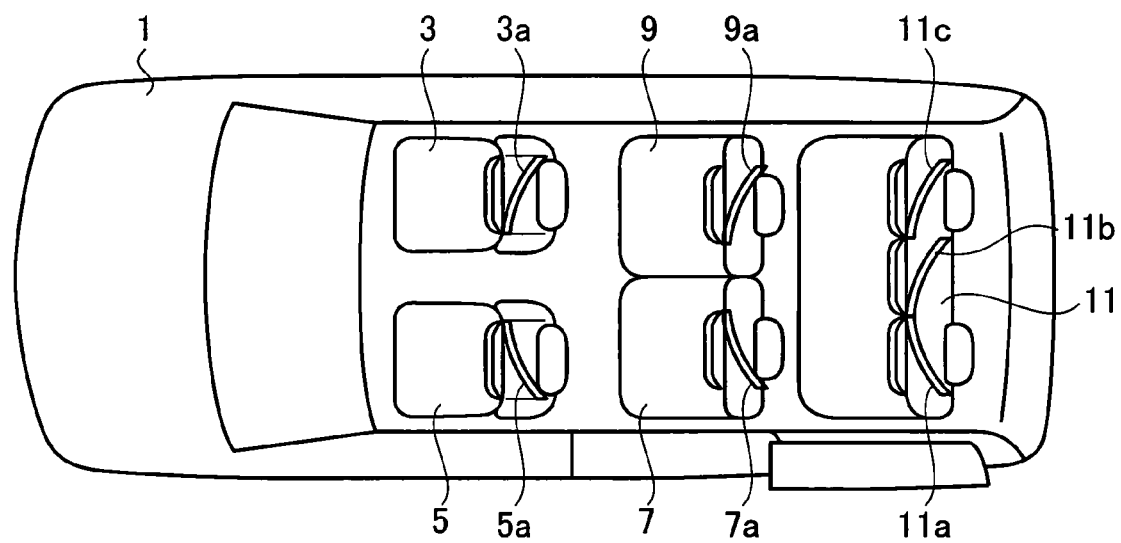
FIG. 7 is an explanatory view illustrating an arrangement of an in-vehicle illuminating apparatus to which a load control unit according to a second embodiment is applied.

FIG. 7 is an explanatory view illustrating the arrangement of an in-vehicle lighting apparatus to which the load control unit according to a second embodiment of the present invention is applied.

As illustrated in FIG. 7, the vehicle 1 has seats 7, 9 in the second line and a seat 11 in the third line arranged behind a driver's seat 3 and an assistant driver's seat 5 (note: the seat 11 in the third line is one for three passengers). The driver's seat 3, the assistant driver's seat 5 and the respective seats 7, 9, 11 behind the former two seats are provided with seat belts 3a, 5a, 7a, 9a, and 11a to 11c, respectively. In the second embodiment, each of the seat belts 3a, 5a, 7a, 9a, and 11a to 11c is formed by a common three-point seatbelt where a tongue is inserted into a buckle.

Next, the electrical constitution for supporting the wearing of the seat belts 7a, 9a, 11a to 11c of the rear seats (seats 7, 9, 11) especially excepting the driver's seat 3 and the assistant driver's seat 5 will be described with reference to a block diagram of FIG. 8.

Figure 8:
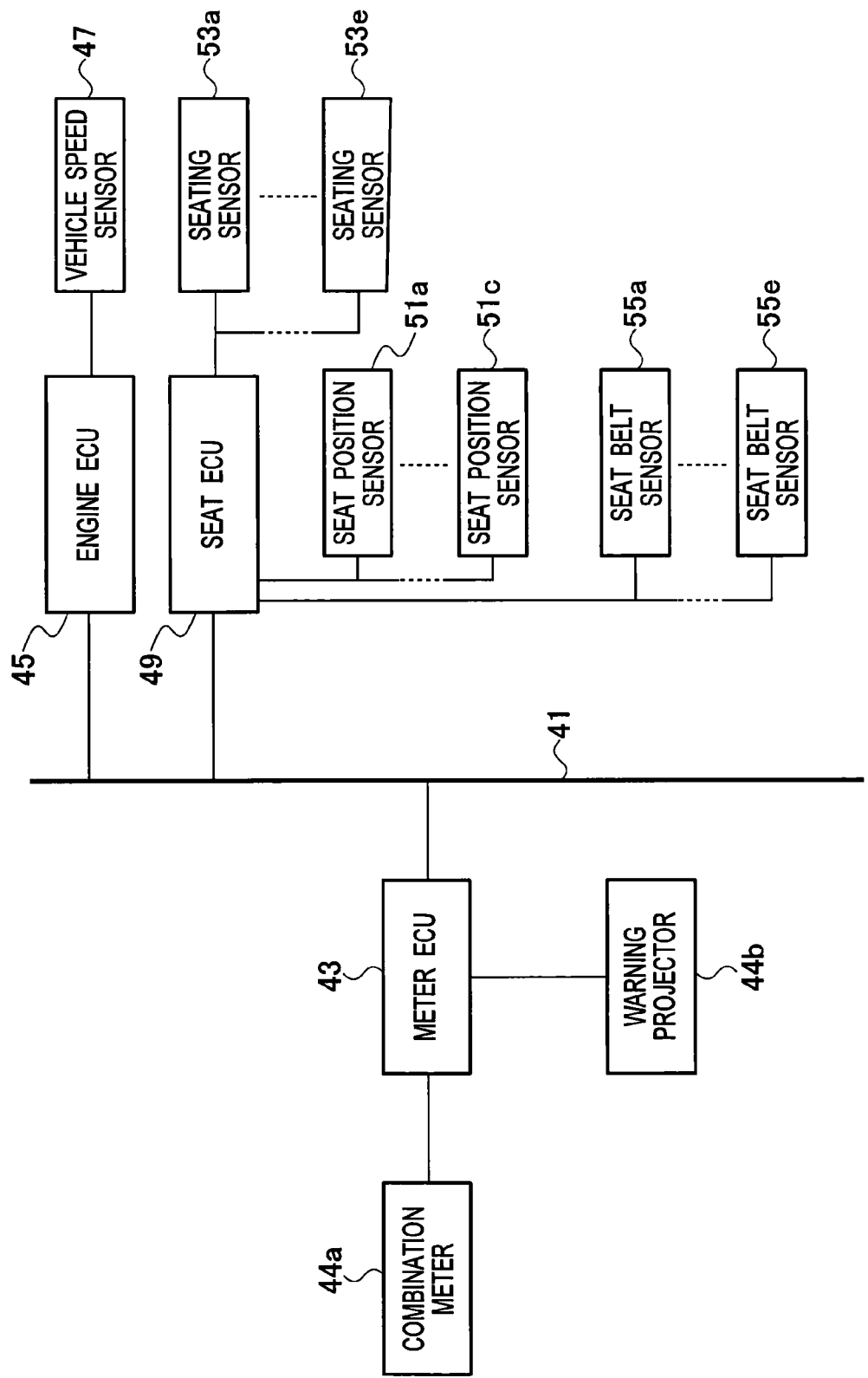
FIG. 8 is a block diagram illustrating an electrical constitution for supporting the use of seat belts illustrated in FIG. 7.

According to the second embodiment, as illustrated in FIG. 8, a combination meter 44a in front of the driver's seat 3 and a warning-symbol projector 44b (projection device) on a ceiling part of the vehicle are connected to a meter ECU 43. This projector 44b projects, for example, substantially seatbelt-shaped warning symbols WS for prompting the passengers to wear the corresponding seat belts (each as illustrated in FIG. 9(a)) on respective upper bodies of the passengers seated on the seats 7, 9, 11, as occasion demands.

Figure 9:
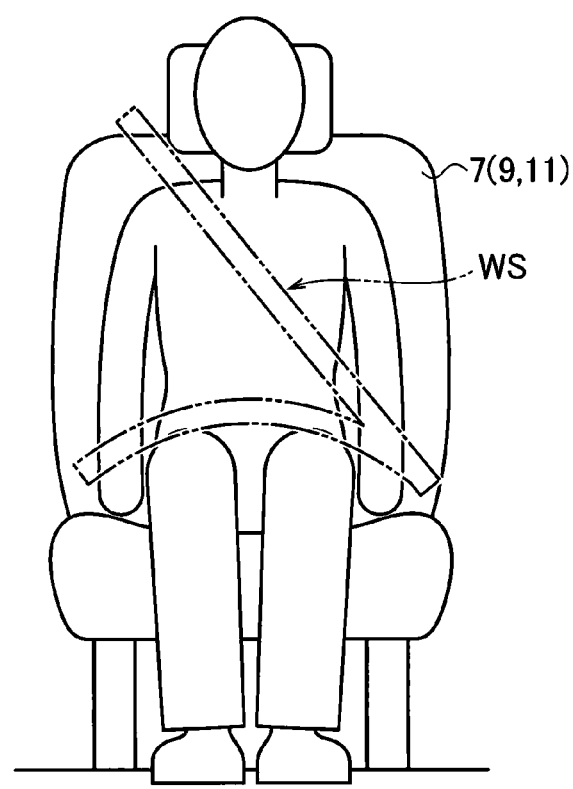
FIGS. 9(a) and 9(b) are explanatory views illustrating projected images by a projector of FIG. 8.
Figure 9:
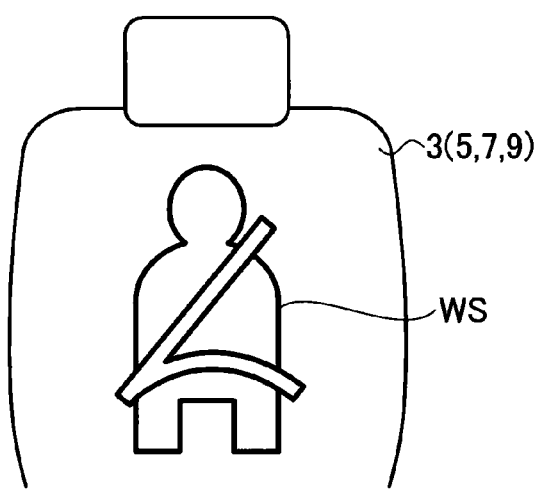

In connection, the projector 44b may be adapted so as to project, as occasion demands, a warning symbol WS for prompting wearing of the seatbelt on the back face of a backrest of the driver's seat 3 or the assistant driver's seat 7 or the back faces of backrests of the respective seats 7, 9, the back faces being positioned at the front of the passengers who are seated on the seats 7, 9, 11 while being not wearing the seat belts 7a, 9a and 11a to 11c, as illustrated in FIG. 9(b).

In FIG. 8, the vehicle speed data of the vehicle 1 measured by the vehicle speed sensor 47 and engine rotation data measured by an engine sensor 48 are inputted from an engine ECU 45 to the meter ECU 43 through the in-vehicle LAN 41, with respect to each constant cycle. Also, the slide position data of the seats 7, 9, 11 in the second and third lines in the front-back direction, which has been detected by the seat position sensors 51a to 51c and transmitted from the seat ECU 49 through the in-vehicle LAN 41, is inputted to the meter ECU 43 with respect to each constant cycle. The slide position data of the seats 7, 9, 11 may be inputted whenever the meter ECU 43 demands the data for the seat ECU 49.

Further inputted from the seat ECU 49 to the meter ECU 43 through the in-vehicle LAN 41 are the seating-condition data about the seats 7, 9 and the seat 11 (for three passengers), which have been detected by the seating sensors 53a to 53e, and the seatbelt fitting-condition data about the seats 7, 9 and the seat 11 (for three passengers), which have been detected by the seat belt sensors 55a to 55e.

Also, the map lamp switches 21a, 23a for turning the map lamps 21, 23 on/off and the reading lamp switches 25a to 31a for turning the reading lamps 25 to 31 on/off are connected to the meter ECU 43 through an interface (not illustrated).

Based on the inputs from the above-mentioned objects to be connected, the meter ECU 43 projects the warning symbol WS for prompting seatbelt wearing (see FIGS. 9(a) and 9(b)) onto a spot where it is easy for the passenger seated on the rear seat to find the symbol, when any passenger seated on the rear seat (the seats 7, 9, or 11) does not wear the seat belt 7a, 9a, 11a to 11c despite a situation where the seat belts 7a, 9a, and 11a to 11c should be worn.

To this end, the meter ECU 43 includes CPU, RAM, ROM, hard-disc, and the others (all not illustrated). Then, according to the program stored in the ROM and using the RAM as a work area, the CPU executes the control of the projector 44b.

Figure 10:
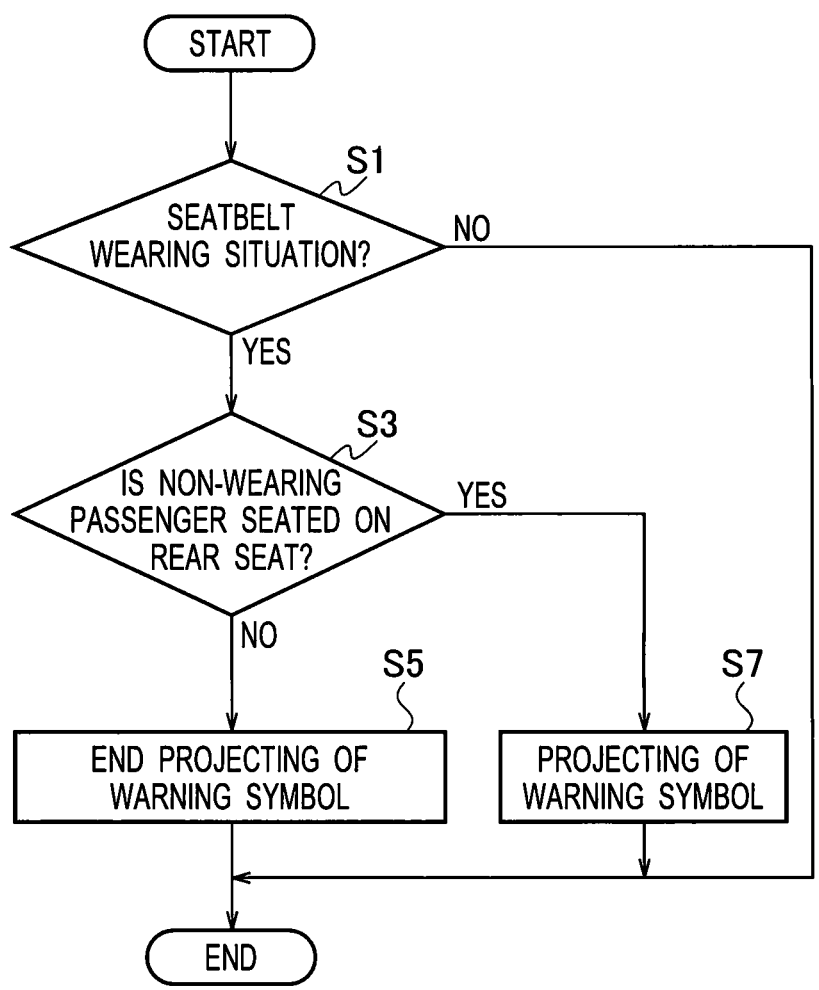
FIG. 10 is a flow chart illustrating the process of controlling the projective displaying of a warning symbol for promoting the use of rear seat belts, which is executed according to a program stored in ROM by a meter ECU of FIG. 8.

Next, the process of projective display control of the warning symbol WS for prompting seatbelt wearing against the passengers seated on the seats 7, 9, 11 that the CPU of the meter ECU 43 of the second embodiment executes according to the program stored in the ROM, will be described with reference to a flow chart of FIG. 10. The CPU executes the control of processes illustrated in FIG. 10 with respect to each predetermined cycle repeatedly.

First, the CPU judges whether or not the vehicle is in a situation that the seat belts 3a, 5a, 7a, 9a, 11a to 11c should be worn by the passengers (i.e. so-called "seatbelt wearing situation"). This judgment can be carried out by judging whether or not the vehicle speed of the vehicle 1 is 0 (zero) or judging whether or not the engine rotation is 0 (zero).

If the vehicle is not in the seatbelt wearing situation (No at step S1), a succession of processes are ended. If the vehicle is in the seatbelt wearing situation (Yes at step S1), it is confirmed whether there is a passenger who does not ware the seat belt 7a, 9a, 11a to 11c on the rear seat (the seat 7, 9, or 11), based on the detection data of the seating sensors 53a to 53e or the seat belt sensors 55a to 55e from the seat ECU 49 (step S3).

If there is no passenger who does not wear the seat belt 7a, 9a, 11a to 11c (No at step S3), the projection of the warning symbol WS by the projector 44b is ended (step S5) and thereafter, the succession of processes are ended. On the other hand, if there exists a passenger who does not wear the seat belt 7a, 9a, 11a to 11c (Yes at step S3), it is carried out to project the warning symbol WS illustrated in FIG. 9(a) or 9(b) on either the passenger or the back face of the backrest of a seat 3, 5, 7, 9 in front of the passenger by the projector 44b (step S7) and therefore, the succession of processes are ended.

As described above, according to the second embodiment, when the vehicle 1 is in a situation where the seat belts 3a, 5a, 7a, 9a, 11a to 11c should be worn (i.e. the seatbelt wearing situation) and if there is a passenger on the rear seat (the seat 7, 9, 11), who does not wear the seat belt 7a, 9a, 11a to 11c on the rear seat in spite of such a situation, then the warning symbol WS for prompting seatbelt wearing is projected on the upper part of the passenger or the back face of the backrest of a seat (the driver's seat 3, the assistant driver's seat 5, the seas 7, 9 in the second line) in front of the passenger, where it is easy for the passenger on the rear seat (the seat 7, 9, 11) to find the symbol.

For this reason, the passenger who does not wear the related seat belt 7a, 9a, 11a to 11c will recognize that the outputted warning is being directed to oneself. Thus, it is possible to prompt seatbelt wearing against a passenger on the rear seat (the seat 7, 9, 11) who does not wear the seat belt, strongly.

In connection, the projection of the warning symbol WS may be ended after a given period has passed or once any condition other than the wearing of the seat belt 7a, 9a, 11a to 11c is established.

INDUSTRIAL APPLICABILITY

The present invention is remarkably useful for constructing a load control unit that controls the drive of a plurality of loads based on control signals inputted to a controller.

The invention claimed is:

1. A load control unit for controlling driving of a plurality of loads based on a control signal inputted from a main control unit, comprising:
a single substrate;
the loads implemented on the substrate; and
a controller-built-in connector comprising a male or female connector part to which a corresponding female or male connector part of a multiplex communication line can be connected, and a controller built in to the controller-built-in connector, the controller-built-in connector mounted on the substrate and to which the respective loads are connected through a circuit pattern of the substrate electrically, wherein
the controller is configured to control the driving of the respective loads based on the control signal which is transmitted from the main control unit and inputted to the controller through the multiplex communication line connected to the connector part of the controller-built-in connector.

2. The load control unit according to claim 1, wherein the loads are LED chips as light sources for illuminating an interior of a vehicle, and
the controller is configured to control lighting of the LED chips.

3. The load control unit according to claim 2, wherein the LED chips comprise three LED chips of R, G and B.

4. The load control unit according to claim 1, wherein the controller comprises a one-chip microcomputer.

5. The load control unit according to claim 1, wherein the respective loads are connected through a circuit pattern of the substrate electrically through L-shaped terminals extending outwardly through a housing of the controller-built-in connector.

6. The load control unit according to claim 1, wherein the controller is connected to the circuit patterns of the substrate through L-shaped terminals extending outwardly through a housing of the controller-built-in connector.

7. The load control unit according to claim 1, wherein the circuit patterns comprise conductive patterns formed on the surface of the substrate.

8. The load control unit according to claim 1, wherein the substrate comprises a metal-core substrate having a metal plate as an intermediate layer.

9. The load control unit according to claim 8, wherein circuit patterns comprise the metal plate as the intermediate layer.

10. The load control unit according to claim 1, wherein the controller-built-in connector comprises a female connector part with which a male connector part of the multiplex communication line can be connected.

11. The load control unit according to claim 10, wherein the multiplex communication line from the main control unit is connected to the controller through the female connector part and the male connector part.

12. The load control unit according to claim 1, wherein the substrate is arranged on a roof liner of a vehicle, and the multiplex communication line is routed inside pillars of the vehicle.

13. The load control unit according to claim 1, wherein slide position data of seats in the front-back direction is inputted to the main control unit with respect to each constant cycle.

14. The load control unit according to claim 13, wherein the slide position data of the seats is detected by seat position sensors and transmitted from a seat control unit to the main control unit through an in-vehicle Local Area Network (LAN).

15. The load control unit according to claim 14, wherein the slide position data of the seats is inputted to the main control unit whenever the main control unit demands the data from the seat control unit.

16. The load control unit according to claim 13, wherein the plurality of loads are turned on or off based on the slide position data of seats in the front-back direction, which has been detected by seat position sensors and transmitted from the seat control unit to the main control unit through an in-vehicle Local Area Network (LAN).

17. The load control unit according to claim 15, wherein in a substantially intermediate slide position of one of the seats, the plurality of loads are turned on with a 100% duty cycle.

18. The load control unit according to claim 15, wherein in a substantially intermediate slide position of one of the seats, other light sources associated with other load control units corresponding to other seats are turned on with a duty cycle other than a 100% duty cycle.

19. The load control unit according to claim 18, wherein a first one of the other light sources for a front line seat of the other seats is turned on with a 20% duty cycle, a second one of the other light sources for a third line seat is turned on with a 50% duty cycle, and a third one of the other light sources for a rearmost seat is turned off.

20. The load control unit according to claim 13, wherein load patterns corresponding to the slide position data of seats in the front-back direction is stored in a table accessible to the main control unit.

* * * * *